Figure 1:
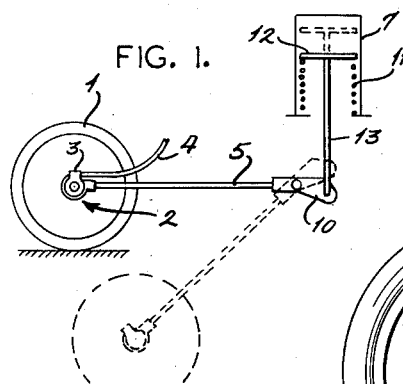

March 10, 1953

P. G. REGNA 2,630,708

RESILIENT COUPLING AND SUSPENSION FOR PORTABLE MEASURING DEVICES

Filed Oct. 10, 1949

2 SHEETS—SHEET 1

INVENTOR:
Paul G. Regna,
By Carr & Carr & Gravely
HIS ATTORNEYS.

INVENTOR:
Paul G. Regna,

By Carr & Carr & Gravely,
HIS ATTORNEYS.

Patented Mar. 10, 1953

2,630,708

UNITED STATES PATENT OFFICE 2,630,708

RESILIENT COUPLING AND SUSPENSION FOR PORTABLE MEASURING DEVICES

Paul G. Regna, St. Louis, Mo., assignor to Wagner Electric Corporation, St. Louis, Mo., a corporation of Delaware Application October 10, 1949, Serial No. 120,466

1 Claim. (Cl. 73—128)

This invention relates to machines for accurately measuring distances traversed by a vehicle and is more particularly directed to an improved coupling for connecting a trailer, in which a measuring device is mounted, to the towing vehicle so that the wheels of the trailer will engage the ground with a substantially constant pressure.

The automotive industry has adopted certain rules concerning the performance characteristics of vehicles. The determination of measurement of these characteristics requires accurate instruments. Two of the quantities or characteristics which are basic in vehicle operation and which, therefore, must be measured as accurately as possible, are speed and stopping distance. There have been several devices developed for measuring these quantities but only the so-called "fifth wheel," which is a wheeled trailer vehicle temporarily attached to the body of the vehicle being tested, is now in general use. As in any measuring instrument, it is vital that all sources of error be either eliminated or reduced to as small a value as possible. In the inventor's copending application Serial No. 574,543, filed January 25, 1945, now Patent No. 2,505,205, of which this application is a continuation-in-part, there is described a suspension for a fifth wheel or trailer wheel which materially reduces errors of measurement in the instruments connected thereto. The instant invention embodies the divisible subject-matter in the above identified application and incorporates improvements made thereon that materially increase the accuracy of measurements made thereby.

One of the objects of this invention is to produce a fifth wheel suspension which may be used with a wide range of height of trailer attachment connections on the towing vehicle for producing accurate indications of quantities measurable with the device.

Another object of the invention is to produce a universally applicable fifth wheel which will be simple in construction and reliable in operation.

A further object of the invention is to provide a fifth wheel device which, when once set and calibrated, will not require any adjustment thereof when attached to the vehicle to be tested in order to produce accurate and reliable test data.

The invention consists in the provision of a trailer mechanism securable to a towing vehicle in which the trailer wheel drives the measuring instruments and in which the wheel is rotatably supported in a lever secured to the towing vehicle, there being an arm secured to the lever acted on by a spring having a predetermined rate and operating within a range so chosen that it will cause the trailer wheel to engage the surface traversed at a substantially constant pressure within the normal range of vertical movement of the lever and trailer wheel.

Figure 2:
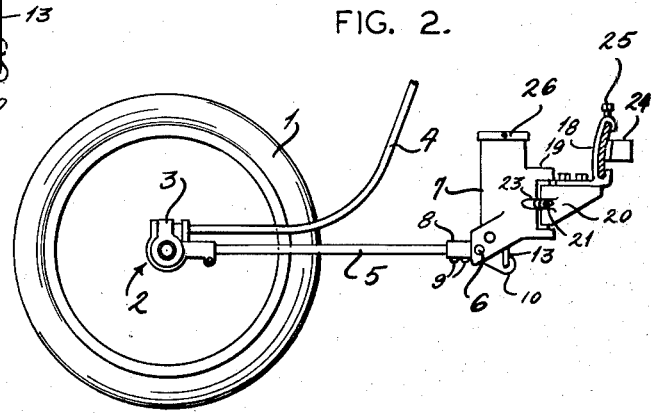
Figure 4:
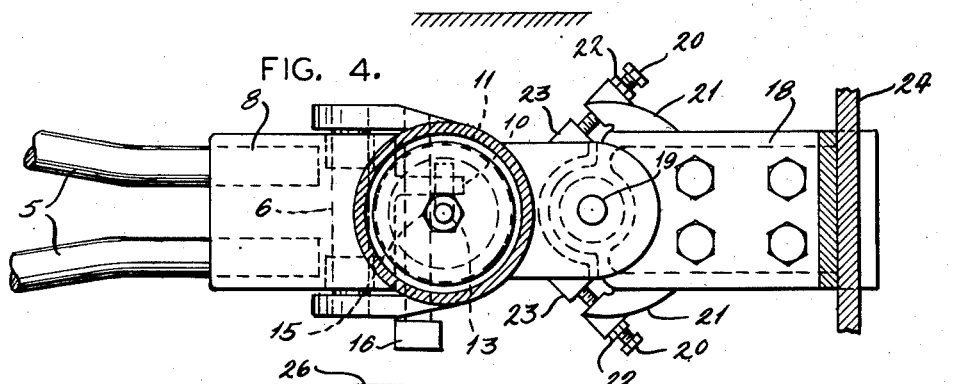
Figure 3:
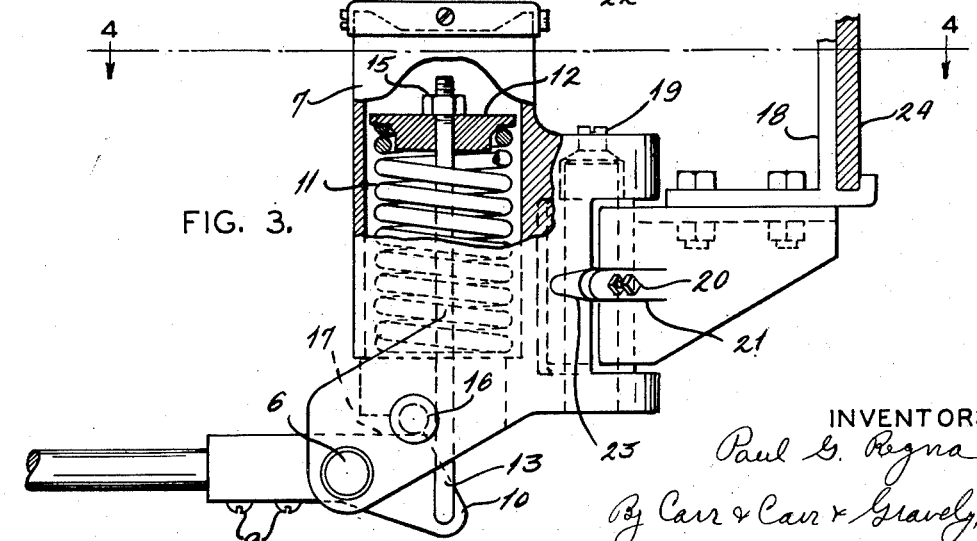
Figure 6:
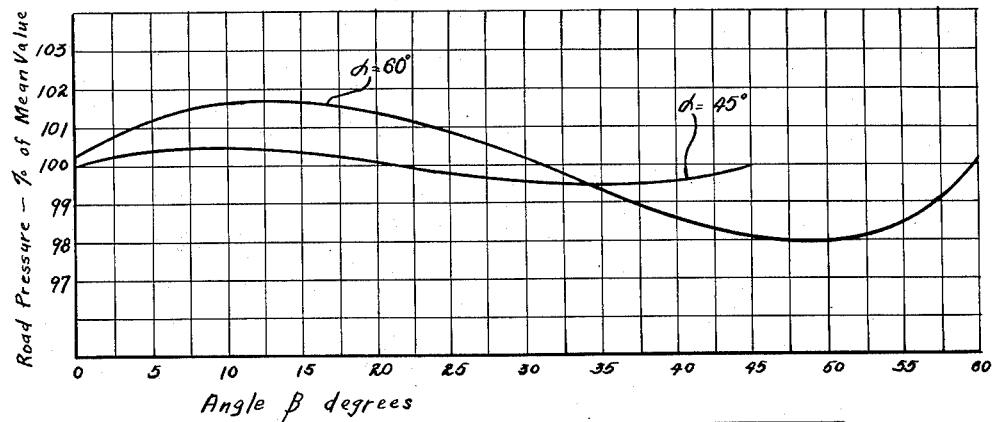
Figure 5:
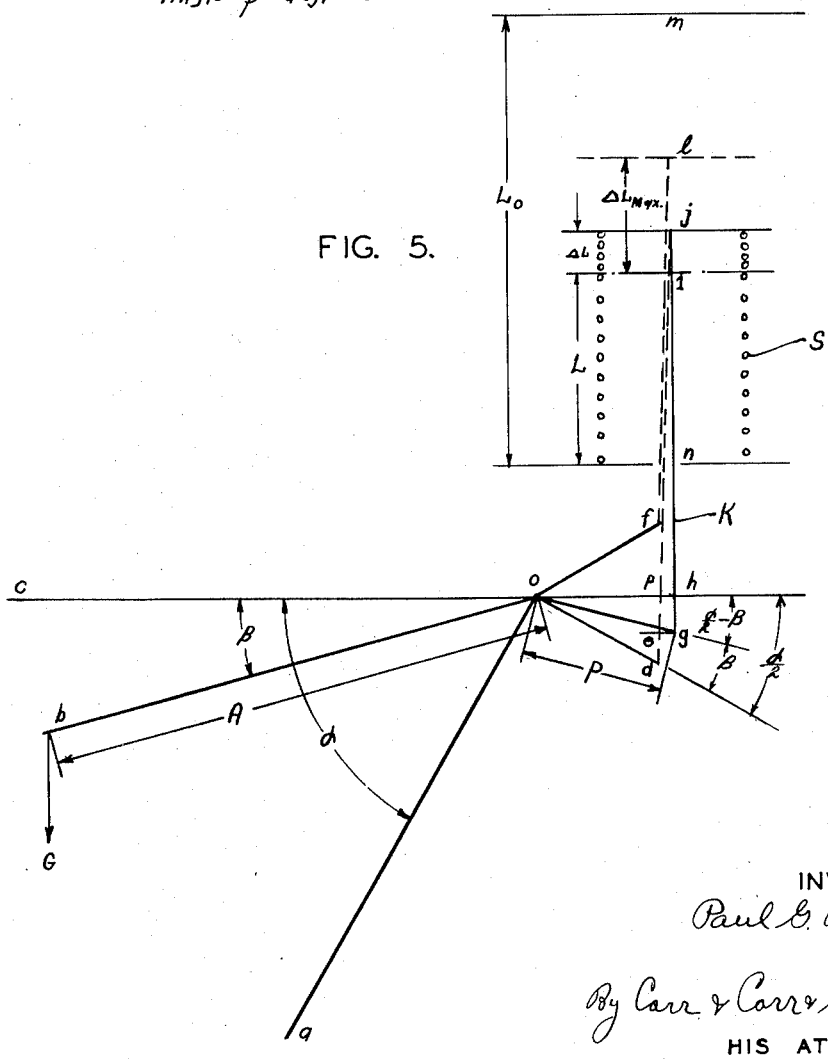

In the drawings:

Fig. 1 is a schematic view of the invention,

Fig. 2 is a side elevation of the physical embodiment of the Fig. 1 device for a fifth wheel assembly incorporating the suspension in position out of contact with the road surface, Fig. 3 is an enlarged elevational view, partly in section, showing construction detail, Fig. 4 is a top view of the suspension taken along the line 4—4 of Fig. 3, Fig. 5 is a line diagram of the fifth wheel suspension showing its principle of operation; and Fig. 6 shows curves which demonstrate the accuracy attainable with the fifth wheel suspension under two conditions of design.

Referring now to Figs. 1 to 4 in which Fig. 1 illustrates the device schematically, there is shown a wheel 1 having a hub assembly 2 thereon to which a gear box 3 is secured. A flexible driving shaft 4 is connected to the gear box 3 for the purpose of driving suitable measuring instruments, as described in the above identified application. A yoke or frame 5 is pivoted to a housing 7 on a pivot 6, the yoke 5 being rigidly fastened to the yoke receiving member 8 by screws 9. An arm 10 is integrally secured to the yoke receiving member 8 to which a connecting link 13 is connected. A spring 11 (Fig. 3) is disposed in housing 7 and abuts a shoulder formed therein, a plug 12 being arranged on the other end of the spring. The connecting link 13 extends between plug 12 and the outer end of arm 10, the upper end of the link being threaded, and a nut 15 thereon is for the purpose of tensioning spring 11. The arm 10 normally extends at an angle to the longitudinal axis of the yoke 5. A lock pin 16 is located in the spring housing 7 that cooperates with a wedge 17 for locking the wheel 1 out of contact with the road surface when it is not in use.

The housing 7 is supported on an attachment adapter assembly 18 by a vertical pivot pin 19 and is prevented from moving laterally more than a small amount by stop screws 20 which are threaded in projection 21 forming part of the attachment adapter assembly 18. The screws are locked to the projections by lock nuts 22. The stop screws 20 engage bosses 23, thereby limiting the lateral travel or sway of the wheel 1 and the yoke 5 when it is necessary to move the towing vehicle in a direction opposite to its normal direction of travel, thereby preventing damage to the fifth wheel.

The attachment adapter assembly 18 is secured to the vehicle bumper 24 and held in place by the clamp bolt 25. A more universal type of adapter is shown in Milster application Serial No. 77,381, filed February 19, 1949, and may be used in place of the device just described. A cap 26 on spring housing 7 prevents ingress of foreign matter.

A mode of operation of this fifth wheel suspension system will be explained with the aid of Fig. 5 which shows a line diagram of the system, yoke 5, arm 10, force exerted by yoke 5 on wheel 1, the spring 11 and the connecting link 13 being shown in schematic form as lines A, P, G, S and K, respectively.

The system diagrammed in Fig. 5 consists of a lever arm $b$—$o$ of length A rigidity fastened to another lever arm $o$—$g$ of length P. The compound lever $b$—$o$—$g$ is pivoted at point $o$. Attached to the lever P at point $g$ is a link K, the opposite end of which is connected to a compressible spring S of rate R at the point $j$.

The angle $c$—$o$—$a$, designated $\alpha$, is determined to be the maximum angle through which this lever system is to operate. The lever P is connected to lever A in such a manner that when lever arm A conicides with the line $c$—$o$, the lever arm P makes an angle of $\alpha/2$ with the extension $o$—$h$ of the line $c$—$o$. The force G is determined to be that force which it is desired to hold substantially constant for any angle assumed by the lever A between the line $c$—$o$ and the line $a$—$o$ i. e. between $0°$ and $\alpha°$.

The center line of the spring S, the line along which the spring-connected end of the link K moves, is constructed perpendicular to the line $o$—$h$ at a point midway between the point $h$ and the intersection $p$ of a line $d$—$f$ with the line $o$—$h$. This location of the line of action of the spring S causes the angular change of the link K with a line perpendicular to the line $c$—$h$ to be so small in a physical embodiment of this invention as to, for all practical purposes, make the length of K multiplied by the cosine of the angle of deviation from the perpendicular to line $c$—$h$ substantially equal to the length of the link K and therefore can be neglected.

The movement of the compound lever about the point $o$ through the angle $\alpha$ from line $c$—$o$ to line $a$—$o$ allows the spring S to extend its length from $n$—$i$, length L, to $n$—$l$, length $$L + \Delta L_{max}$$

This extension does not allow the spring to travel to its unstressed length $L_0 (n$—$m)$ since the lever would then have no force acting thereon other than that of the unbalanced weight of the lever system. For purposes of this statement of operation the weight of the lever system will be neglected since practical considerations dictate that a very light construction be used in the manufacture of the device. However, in any device of this nature the effect of the static weight of the lever arms A and P can be counteracted by the use of balancing weights so placed about the point O as to produce moments of force opposite those produced by the structure itself.

Having described the system in detail, the mathematical derivation of the equation which governs the force G will be developed.

With the lever $b$—$o$—$g$ in such a position that angle $\beta$ is zero, we have the force $F_{s_1}$ of the spring S exerted on the lever P through the link K at the point $d$.

(1) $$F_{s_1} = R(L_0 - L)$$

and the moment $M_{s_1}$ of this force about the pivot point O $$M_{s_1} = P \cos \frac{\alpha}{2} (L_0 - L) R$$

(2) $$M_{s_1} = RP \cos \frac{\alpha}{2} (L_0 - L)$$

while the moment $M_{g_1}$ of force G about pivot point O is (3) $$M_{g_1} = GA$$

Since the system is in static equilibrium, Equation 3 must equal Equation 2 so $$M_{g_1} = M_{s_1}$$

and (4) $$GA = RP \cos \frac{\alpha}{2} (L_0 - L)$$

or (5) $$G = \frac{RP}{A} \cos \frac{\alpha}{2} (L_0 - L)$$

Equation 5 is, however, valid only when the lever A coincides with the line $c$—$o$ and must, therefore, be modified into a general form to be applicable to the system under all conditions.

Let it now be assumed that the lever A makes any angle $\beta$ between $0°$ and $\alpha°$ with the line $c$—$o$. The rotation of the lever P through the angle $\beta$ from the line $o$—$d$ allows an elongation $\Delta L$ of the spring S which is found as follows. The elongation $\Delta L$ is the amount $d$—$e$ which is the distance $p$—$d$ less the distance $p$—$e$, therefore (6) $$\Delta L = P \sin \frac{\alpha}{2} - P \sin \left( \frac{\alpha}{2} - \beta \right)$$

The compression of the spring S at any angle $\beta$ between $0°$ and $\alpha°$ is therefore (7) $$L_0 - L - \Delta L = L_0 - L - P \sin \frac{\alpha}{2} + P \sin \left( \frac{\alpha}{2} - \beta \right)$$

The spring force $F_s$ exerted at the remote end of lever P is then (8) $$F_s = R \left[ L_0 - L - P \sin \frac{\alpha}{2} + P \sin \left( \frac{\alpha}{2} - \beta \right) \right]$$

which decreases as the lever P proceeds from line $o$—$d$ toward line $o$—$f$, the limiting condition.

As the lever P rotates about pivot point O its projected length on the line $o$—$h$ is seen to be $$P \cos \left( \frac{\alpha}{2} - \beta \right)$$

The moment $M_s$ of the force $F_s$ about the pivot point O is therefore (9) $$M_s = RP \cos \left( \frac{\alpha}{2} - \beta \right) \left[ L_0 - L - P \sin \frac{\alpha}{2} + P \sin \left( \frac{\alpha}{2} - \beta \right) \right]$$

The projection of the lever A on the line $c$—$o$ also varies as the cosine of the angle $\beta$. Therefore, the moment $M_g$ of force G about the pivot point O is

(10) $$M_g = GA \cos \beta$$

Now, since static equilibrium is inherent in the system, the right hand terms of Equations 10 and 9 may be equated thus

(11)
$$GA \cos \beta = RP \cos\left(\frac{\alpha}{2}-\beta\right)\left[L_0 - L - P\sin\frac{\alpha}{2} + P\sin\left(\frac{\alpha}{2}-\beta\right)\right]$$

and so, solving for the force G, we get the equation which governs its behavior

(12)
$$G = \frac{RP}{A} \frac{\cos\left(\frac{\alpha}{2}-\beta\right)}{\cos \beta}\left[L_0 - L - P\sin\frac{\alpha}{2} + P\sin\left(\frac{\alpha}{2}-\beta\right)\right]$$

A check of Equation 12 is to make the angle $\beta$ equal to zero and then compare the equation to Equation 5 above. When angle $\beta$ is made zero in Equation 12 we find that it does reduce to Equation 5 and therefore is correct.

A study of Equation 12 discloses that the terms within the brackets define the compression of spring S at an angle $\beta$ and the terms outside of the brackets define the rate of the spring and the ratio of the effective moment arms of the levers P and A.

It has been determined that there are certain conditions which, when applied to the terms of Equation 12, will produce a force G which is substantially constant over the maximum useful angle $\alpha$ of the device. The angle $\alpha$ and the quantity $L_0-L$ can be so selected as to produce a substantially straight line curve when applied to Equation 12 with all the other quantities being held constant. Any desired value of the force G can then be produced by merely changing the ratio of spring R divided by lever arm length A. Obviously, the smaller the angle $\alpha$ the more nearly constant will be the force G over the entire range. The maximum angle $\alpha$ which has been determined to be practical is of the order of 60 degrees. It is further noted that the R of the spring can be any value so long as the spring is compressed by the amount $L_0-L$ when the angle $\beta$ is zero. The lever arm P also must be determined for a given relation of $L_0-L$ to obtain the desired substantially straight line curve. The Equation 12 above serves to illustrate the inter-relation of the various parts of the fifth wheel support, but is considered to be unwieldy when it is desired to determine the proper relation for producing as nearly a straight line action as possible, therefore we may write Equation 12

$$G = \frac{R}{A}\frac{\cos\left(\frac{\alpha}{2}-\beta\right)}{\cos \beta}\left[P(L_0-L) - P^2\sin\frac{\alpha}{2} + P^2\sin\left(\frac{\alpha}{2}-\beta\right)\right]$$

(13)
$$G = \frac{R}{A}\frac{\cos\left(\frac{\alpha}{2}-\beta\right)}{\cos \beta}\left[P^2\left(\frac{L_0-L}{P}\right) - P^2\sin\frac{\alpha}{2} + P^2\sin\left(\frac{\alpha}{2}-\beta\right)\right]$$

Examination discloses that the term in Equation 13

$$\frac{L_0-L}{P}$$

is a constant; therefore

(14)
$$M = \frac{L_0-L}{P}$$

may be substituted in Equation 13 and at the same time remove the factor $P^2$ from the brackets

(15)
$$G = \frac{RP^2}{A}\frac{\cos\left(\frac{\alpha}{2}-\beta\right)}{\cos \beta}\left[M - \sin\frac{\alpha}{2} + \sin\left(\frac{\alpha}{2}-\beta\right)\right]$$

All of the physical dimensions of the suspension system have now been segregated from the curve shape determining terms of the equation which consists of trigonometric functions of the inherent angles and a constant. We may, therefore transpose the equation to

(16)
$$\frac{GA}{RP^2} = \frac{\cos\left(\frac{\alpha}{2}-\beta\right)}{\cos \beta}\left[M - \sin\frac{\alpha}{2} + \sin\left(\frac{\alpha}{2}-\beta\right)\right]$$

and by a few trial computations determine the value of M which will produce the accuracy desired.

The computed results based on the above formula for values of $\alpha=45°$ and $60°$ and $M=2.62$ and 2 respectively, have been plotted in Figure 6 in terms of percent of the arithmetic mean value in order that the two sets of data may be readily compared. These curves are plotted on an expanded scale for the purpose of showing the deviation from a straight line which would otherwise not be apparent. It is seen that the curve labeled $\alpha$ equals 45° deviates from the true straight line value by a maximum amount of ½% while the curve labeled $\alpha$ equals 60° deviates by a maximum amount of about 2%. The 45° case is considered ample for covering the application of this device to the majority of vehicles to be tested so will be more often used in the design of fifth wheel suspensions.

Having determined the constant M which produces substantially the desired curve, it is necessary to physically set the suspension for producing a constant road pressure on the fifth wheel. The compression of the spring 10 is calculated by

(17)      $(L_0-L) = PM$

The nut 15 is now screwed down on the link 13 until yoke 5 is horizontal so that spring 11 has been compressed the calculated amount. The suspension is then tested by measuring the road force on the wheel at a number of different angles of displacement $\beta$ between 0° and $\alpha$° and slight adjustment of nut 15 is made for producing the most uniform road pressure over the entire design range of the suspension. After the adjustment is completed, the nut 15 is permanently locked in place.

The design of a physical embodiment of this invention consists in selecting the desired ground pressure to be used and the length of lever arm P, then calculating the length of the yoke 5 (Figs. 1 and 2) corresponding to lever arm A of Fig. 4, and selecting the rate of spring 11 such that the desired value of ground pressure is attained. The angular displacement of the line connecting the center of the pivot 6 with the center point of attachment of the connecting link 13 to the arm 10 from the extension of the center of yoke 5, is made ½ the maximum angular displacement desired to be applied to yoke 5 for all conditions of operation.

The stop screws 20 are then adjusted to allow a small lateral movement of the wheel of the order of 7½° right or left. This is necessary for preventing damage to the wheel assembly should the vehicle be inadvertently moved in a rearward direction while the fifth wheel is in contact with the road surface.

Having so adjusted the assembly, it is merely necessary to attach the fifth wheel assembly to a convenient place on the body of the vehicle to be tested and connect the flexible driving cable 4 to the desired instruments which may be located within the vehicle being tested for easy access by the driver thereof, although they may be carried on yoke 5.

After the initial adjustment, the fifth wheel assembly is ready for attachment to the vehicle. Upon being attached to the vehicle the assembly is carried to the point desired to make the test with the locking pin 16 in place which holds the fifth wheel out of contact with the road surface, thus reducing unnecessary wear thereon. Upon reaching the test area, the driver removes the lock pin 16, allowing the wheel 1 to contact the road surface, and is then ready to make such tests as may be desired.

What I claim is:

A mechanism for association with a vehicle for driving instruments that measure the behavior of said vehicle following a brake application comprising a wheel for actuating the measuring instruments, a frame for said wheel and constituting a moment arm therefor, means for pivotally connecting said frame to said vehicle, a second moment arm connected to and displaced angularly downwardly from said frame, a vertically disposed spring supported by said means; and means connected between said spring and said second moment arm for applying the force of the spring through the second moment arm to the wheel moment arm and thus to the wheel for applying a uniform pressure of the wheel on the road regardless of the vertical displacement of said wheel with respect to said vehicle.

PAUL G. REGNA.

REFERENCES CITED

The following references are of record in the file of this patent:

UNITED STATES PATENTS

| Number | Name | Date |
|---|---|---|
| 1,950,583 | Watkins | Mar. 13, 1934 |
| 2,279,409 | Milster et al. | Apr. 14, 1942 |
| 2,370,141 | Brunner | Feb. 27, 1945 |